United States Patent
Tang et al.

(10) Patent No.: US 11,374,796 B2
(45) Date of Patent: Jun. 28, 2022

(54) COMPRESSIVE SENSING BASED CHANNEL RECOVERY CONSIDERING TIME VARIATION OF THE CHANNEL

(71) Applicant: Samsung Electronics Co., Ltd., Suwon-si (KR)

(72) Inventors: Yanru Tang, San Diego, CA (US); Hongbing Cheng, San Diego, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 17/139,991

(22) Filed: Dec. 31, 2020

(65) Prior Publication Data

US 2022/0123963 A1    Apr. 21, 2022

Related U.S. Application Data

(60) Provisional application No. 63/092,501, filed on Oct. 15, 2020.

(51) Int. Cl.
*H04L 25/02* (2006.01)
*H04B 7/0456* (2017.01)

(52) U.S. Cl.
CPC ....... *H04L 25/0202* (2013.01); *H04B 7/0456* (2013.01)

(58) Field of Classification Search
CPC .. H04L 25/0202; H04L 25/024; H04B 7/0456
See application file for complete search history.

(56) References Cited

U.S. PATENT DOCUMENTS

| | | | |
|---|---|---|---|
| 8,165,328 B2 * | 4/2012 | Bramslow | H03G 9/025 381/312 |
| 8,432,785 B2 * | 4/2013 | Van Nee | H04L 25/0224 370/204 |
| 8,942,321 B2 * | 1/2015 | Shental | H04L 25/0248 375/340 |
| 9,036,684 B2 | 5/2015 | Hui et al. | |
| 9,537,587 B2 | 1/2017 | Chai et al. | |
| 10,009,084 B2 | 6/2018 | Kim et al. | |
| 10,027,389 B2 | 7/2018 | Mo et al. | |
| 10,270,624 B2 | 4/2019 | Lee | |
| 10,484,207 B2 | 11/2019 | Lee | |

(Continued)

FOREIGN PATENT DOCUMENTS

WO    2019195426 A1    10/2019

OTHER PUBLICATIONS

Ratnam, Vishnu V et al., "Periodic Analog Channel Estimation Aided Beamforming for Massive MIMO Systems," in EEE Transactions on Wireless Communications, vol. 18, No. 3, Mar. 2019, pp. 1581-1594, date of publication Jan. 24, 2019.

*Primary Examiner* — Jean B Corrielus
(74) *Attorney, Agent, or Firm* — Renaissance IP Law Group LLP

(57) ABSTRACT

According to one general aspect, a method may include estimating a combined channel. The method may include estimating a channel correlation based, at least in part upon a measurement of a combined channel for a current beam sweeping interval and a previous beam sweeping interval. The method may include recovering a current channel by employing a compressive sensing-based channel recovery employing estimated channel correlation, a previous measurement, and a current measurement.

20 Claims, 4 Drawing Sheets

(56) References Cited

U.S. PATENT DOCUMENTS

| | | | |
|---|---|---|---|
| 2012/0259590 A1* | 10/2012 | Ye | G06K 9/00523 |
| | | | 702/189 |
| 2013/0163645 A1 | 6/2013 | Kuo et al. | |
| 2014/0140375 A1* | 5/2014 | Muqaibel | H04B 1/71637 |
| | | | 375/146 |
| 2017/0272278 A1* | 9/2017 | Abdoli | H04L 25/0202 |
| 2019/0212409 A1* | 7/2019 | Wu | H04L 25/0202 |
| 2019/0312767 A1* | 10/2019 | Bose | H04B 7/024 |
| 2020/0067740 A1 | 2/2020 | Breiling et al. | |
| 2020/0163071 A1 | 5/2020 | Gao et al. | |
| 2021/0124006 A1* | 4/2021 | Sheng | G01S 3/10 |

\* cited by examiner

COMPRESSIVE SENSING BASED CHANNEL RECOVERY CONSIDERING TIME VARIATION OF THE CHANNEL

CROSS-REFERENCE TO RELATED APPLICATION

This application claims priority under 35 U.S.C. § 119 to Provisional Patent Application Ser. No. 63/092,501, entitled "COMPRESSIVE SENSING BASED CHANNEL RECOVERY CONSIDERING TIME VARIATION OF THE CHANNEL" filed on Oct. 15, 2020. The subject matter of this earlier filed application is hereby incorporated by reference.

TECHNICAL FIELD

This description relates to wireless communication, and more specifically to a system and method for compressive sensing based channel recovery considering time variation of the channel.

BACKGROUND

Hybrid beamforming is generally a technique that may be used to partition beamforming between the digital and radio frequency (RF) domains. Given beam sweeping measurements, a user equipment (UE) as receiver recovers the channel to derive the beamforming (BF) vector for data reception.

SUMMARY

According to one general aspect, a method may include estimating a combined channel. The method may include estimating a channel correlation based, at least in part upon a measurement of a combined channel for a current beam sweeping interval and a previous beam sweeping interval. The method may include recovering a current channel by employing a compressive sensing-based channel recovery employing estimated channel correlation, a previous measurement, and a current measurement.

According to another general aspect, a system may include a processor. The system may include a memory configured to store non-transitory processor-executable instructions. The instructions may, when executed by the processor, cause the processor to: estimate a combined channel; estimate a channel correlation based, at least in part upon a measurement of a combined channel for a current beam sweeping interval and a previous beam sweeping interval; and recover a current channel by employing a compressive sensing-based channel recovery employing estimated channel correlation and measurements from current and multiple previous beam sweeping intervals.

According to another general aspect, a method may include estimating a combined channel. The method may include estimating a channel correlation based, at least in part upon a measurement of a combined channel for a current beam sweeping interval and a previous beam sweeping interval. The method may further include recovering a current channel by employing a simultaneous orthogonal matching pursuit (SOMP) or closed form SOMP technique.

The details of one or more implementations are set forth in the accompanying drawings and the description below. Other features will be apparent from the description and drawings, and from the claims.

A system and/or method for wireless communication, and more specifically to a system and method for compressive sensing based channel recovery considering time variation of the channel, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
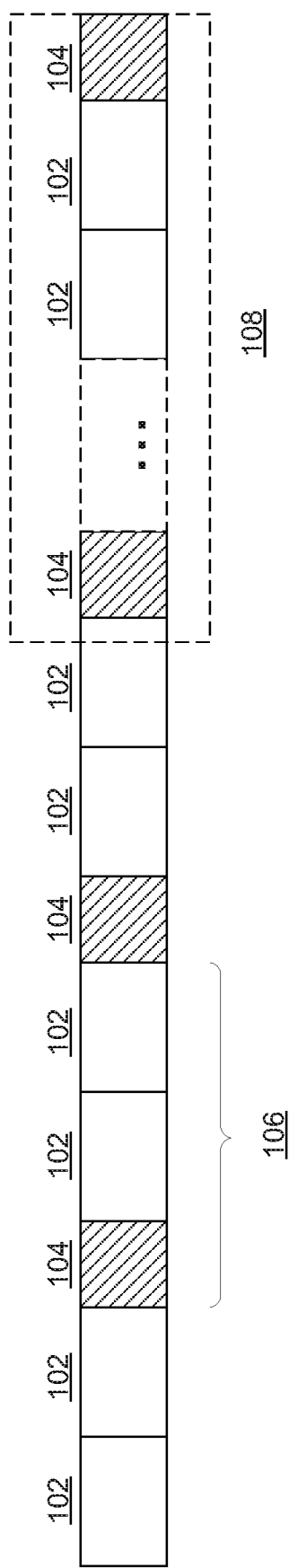
FIG. 1 is a block diagram of an example embodiment of a communication in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of a channel communication 100 for wireless or radio frequency (RF) communication. In the illustrated embodiment, the communication 100 may include multiple blocks of data 102, and periodic beam sweeping reference signals 104 that may aid in channel recovery. In this context "channel recovery" may include the reconstruction of the data 102 without the noise element of wireless communication.

In the illustrated embodiment, the communication 100 may include beam sweeping periods 106, defined by the time between two reference signals 104. In some embodiments, the beam sweeping periods 106 may occur at fixed predefined intervals. In various embodiments, the system 100 may also include a window 108 that defines a number of periods 106 (e.g., M periods) that may be employed by the disclosed subject matter for channel recovery.

In some hybrid beamforming systems, when a synchronization signal block (SSB) is used for data receiving (Rx) beam sweeping, it is often similar to have one measurement considering one SSB burst set. Given a system with multiple SSB burst sets, in various embodiments, a system may apply compressive sensing (CS) tools to perform channel recovery to improve the performance of analog beamforming. Given measurements from multiple SSB burst sets, in various embodiments, channel angles of arrivals (AoAs) may stay invariant and the corresponding coefficients may evolve in time according to first order autoregressive (AR(1) or AR1) correlation model. Under this assumption, considering multiple SSB burst sets, a system or technique may include first estimating channel time correlation and then performing CS-based channel recovery to improve analog beamforming gain.

Figure 2:
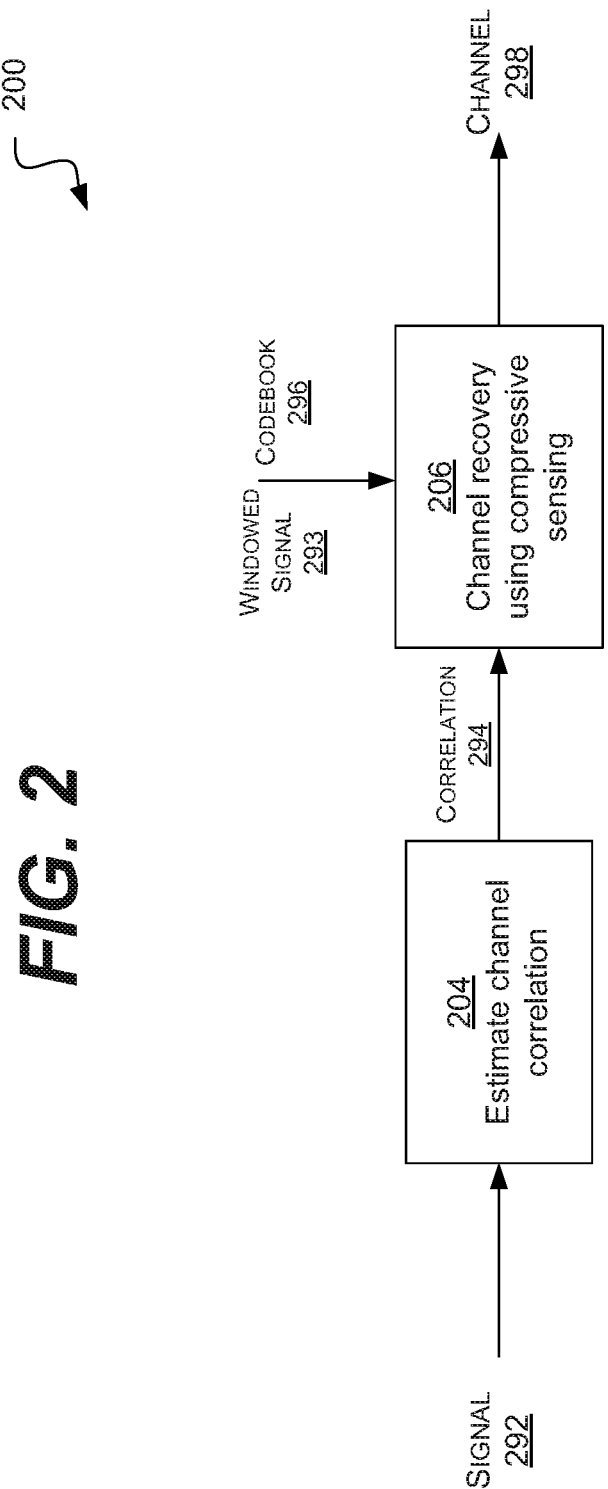
FIG. 2 is a block diagram of an example embodiment of a system in accordance with the disclosed subject matter.

Turning to FIG. 2, FIG. 2 illustrates a block diagram or system to embody 200 of a process or technique in which compressive sensing based channel recovery considering time variation of the channel is performed according to one embodiment. In the illustrated embodiment, the system 200 may receive a signal 292. The signal 292 may include a channel element and noise. In one embodiment, the system 200 may include circuits or devices to estimate the channel correlation 294, as described below. The correlation 294 may be produced by these circuits.

In the illustrated embodiment, the system 200, via circuits or devices, may perform channel recovery using compressive sensing 206. In various embodiments, this may be done using, at least in part, the correlation 294, a windowed or time-limited version of the signal 293, and a codebook 296. In such an embodiment, the channel 298 may be recovered.

To understand the disclosed subject matter a few values and terms shall be defined.

$$W_t = \begin{bmatrix} w_{1,t} \\ \vdots \\ w_{M,t} \end{bmatrix} \in \mathcal{C}^{M \times N_R}$$

is the beam sweeping codebook in the $t^{th}$ beam sweeping interval.

$w_{m,t} \in \mathcal{C}^{1 \times N_R}$ is the $m^{th}$ beamforming (row) vector in the $t^{th}$ beam sweeping interval.

$H_t \in \mathcal{C}^{N_R \times K}$ is the unknown analog channel in the $t^{th}$ beam sweeping interval.

$Y_t \in \mathcal{C}^{M \times K}$ is an estimate of the combined channel $W_t H_t$.

$V_t$ or $N_t \in \mathcal{C}^{M \times K}$ is the combined channel estimation error or noise.

$N_R$ is the number of Rx antennas per RF chain.

M is the number of measurements per beam sweeping interval.

K is the number of subcarriers.

In various embodiments, for the t-th beam sweeping interval the combined channel may be represented as $Y_t = W_t H_t + N_t$. In such an embodiment, the UE may attempt to recover the channel $H_t$ based, at least in part, upon the $Y_t, \ldots, Y_{t-T+1}$.

In the illustrated embodiment, denote $H_t \in \mathcal{C}^{N_R \times K}$ as the unknown channel in the t-th beam sweeping interval, where K denotes the number of subcarriers and $N_R$ denotes the number of Rx antennas per RF chain. The following discussion assumes that an UE has a single RF chain, and it applies to each in the case of multiple chains.

In various embodiments, to model the case where a synchronization signal block (SSB) is used for Rx beam sweeping, in each beam sweeping period, the UE may use one beamforming vector to receive signal from all antennas. In the t-th beam sweeping interval, denote $w_t \in \mathcal{C}^{1 \times N_R}$ as the beamforming vector, $P_t = \text{diag}(p_{1t}, \ldots, p_{Kt})$ as the reference signal. The received signal $z_t \in \mathcal{C}^{1 \times K}$ at UE is given as $z_t = w_t(H_t P_t + N_t)$.

Given measurements, the system or technique may aim to recover the channel by exploiting its angular sparsity, such that the beamforming vector for data reception may be derived accordingly to improve analog beamforming gain. To enable CS channel recovery, more than one measurement may be desired. Therefore, the technique may consider channel recovery using measurements in current and previous beam sweeping intervals.

Assume that UE collects measurements within M beam sweeping intervals or number of measurements. In such an embodiment, in the t-th beam sweeping interval, the UE may know $y_t, y_{t-1}, \ldots, y_{t-M+1}$ as well as $w_t, w_{t-1}, \ldots, w_{t-M+1}$. In various embodiments, the channel angles of arrivals (AoAs), denoted by $\theta_1, \ldots, \theta_L$, may stay invariant during M intervals. In such an embodiment, the following may be defined $$x_m = \pi \cos(\theta_m), m=1, \ldots, L$$

and $$A_l = [a(x_1), \ldots, a(x_L)] \in \mathcal{C}^{N_R \times L}, a(x_l) = \begin{bmatrix} 1 \\ \vdots \\ e^{j(N_R-1)x_l} \end{bmatrix} \in \mathcal{C}^{N_R}$$

as a collection of antenna response vectors $a(x_l)$ corresponding to each channel AoA. This may be based on an assumption that the UE has a uniform linear array with antenna separation equaling half the wavelength. In the case of other antenna configurations, the following discussion still applies with a different expression for $a(x_l)$.

In such an embodiment, the AoAs may remain relatively constant or slowly change over time. In such an embodiment, the channel for different time may be defined as follows.

$$H_t = A_l S_t, \text{ where } S_t \in \mathcal{C}^{L \times K}, \forall t$$

In the illustrated embodiment, if channel estimation error within M intervals is white Gaussian, the ML solution to the dominant AoA may be $$\hat{x} = \underset{x, s_m}{\text{argmin}} \sum_{m=0}^{M-1} \| y_{t-m} - w_{t-m} a(x) s_{t-m} \|^2$$

where time correlation of coefficients corresponding to different channel AoAs may be modeled by the same unknown parameter a, which may be complex.

As described above, in various embodiments, the channel AoAs may stay substantially invariant but the coefficients vary according to a AR1 model:

$$S_t = \alpha S_{t-1} + V_t$$

for some unknown noisy term $V_t \in \mathcal{C}^{L \times K}$, which may be independent from $S_{t-1}$. In such an embodiment, $S_t$ may be the path gain for AoAs at each subcarrier, each of size L×K.

To simplify, the current measurements may be employed to estimate previous channel $H_{t-m+1}$, and the received combined channel may be written as:

$$Y = \text{diag}(\alpha^{M-1}, \alpha^{M-2}, \ldots, 1) W H_{t-M+1} + E \text{ where}$$

$$Y = \begin{bmatrix} y_t \\ \vdots \\ y_{t-M+1} \end{bmatrix}, W = \begin{bmatrix} w_t \\ \vdots \\ w_{t-M+1} \end{bmatrix}, E = \begin{bmatrix} e_t \\ \vdots \\ e_{t-M+1} \end{bmatrix}$$

In such an embodiment, $H_{t-M+1}$ may be recovered using closed form simultaneous orthogonal matching pursuit (SOMP), if a is known.

In the illustrated embodiment, assuming that a is known, the following may be defined $$\tilde{W} = \wedge W_t, \text{ where } \wedge = \text{diag}([\alpha^{M-1}, \ldots, 1]) \in \mathcal{C}^{M \times M}$$

as the equivalent measurement matrix. In such an embodiment, the dominant AoA may be estimated as:

$$\hat{x}_1 = \underset{x, s}{\text{argmin}} \| Y - \tilde{W} a(x) s \|_F$$

Given x, a coefficient that may minimize the residual may be given as:

$$\hat{s} = \frac{\tilde{\varphi}(x)^H Y}{\| \tilde{\varphi}(x) \|^2} \in \mathcal{C}^{1 \times K}, \text{ where } \tilde{\varphi}(x) = \tilde{W} a(x) \in \mathcal{C}^M$$

Which may reduce to:

$$\hat{x}_1 = \underset{x}{\text{argmax}} \frac{\tilde{\varphi}(x)^H Y Y^H \tilde{\varphi}(x)}{\| \tilde{\varphi}(x) \|^2}.$$

In various embodiments, if $\tilde{W}$ does not satisfy the desired conditions, a technique may employ a conventional SOMP technique to estimate each remaining AoA by iteration and recover the channel accordingly.

In the illustrated embodiment, for closed-form SOMP, given M measurements and estimated dominant AoA $\hat{x}_1$, it estimates remaining M−1 AoAs, denoted respectively by $\hat{x}_m$, m=2, ..., M, according to the following:

$$\hat{x}_m = \hat{x}_1 + \frac{2\pi}{M}(m-1), m = 2, \ldots, M.$$

In such an embodiment, the selected bases to approximate measurements may be unitary and therefore coefficients can be derived from.

$$\tilde{S} = (\tilde{W}\hat{A}_I)^H Y = \begin{bmatrix} \hat{s}_1 \\ \vdots \\ \hat{s}_M \end{bmatrix} \in \mathcal{C}^{M \times K}$$

In such an embodiment, channel may be recovered as:

$\hat{H}_t = \hat{A}_I \hat{S}$, where $\hat{A}_I = [a(\hat{x}_1), \ldots, a(\hat{x}_M)]$ In various embodiments, closed-form SOMP may recover the same number of AoAs as that of the measurements. When $M = N_R$, closed-form SOMP is equivalent to least square (LS) channel recovery.

In the following, the disclosed subject matter also considers recovering a different number of AoAs. Assume that $\hat{x}_1, \ldots, \hat{x}_M$ are sorted such that $$\|\hat{s}_1\|^2 \geq \|\hat{s}_2\|^2 \geq \cdots \geq \|\hat{s}_M\|^2$$

In various embodiments, the technique may approximate the channel using one AoA. In such an embodiment, the estimation of coefficients may not be desirable and the channel at each subcarrier may be recovered as $$\hat{h}_k = a(\hat{x}_1) = \begin{bmatrix} 1 \\ \vdots \\ e^{j(N_R-1)\hat{x}_1} \end{bmatrix}$$

In one embodiment, the technique may approximate the channel using $\hat{L}$ AoAs, where $1 < \hat{L} < M$, the technique may estimate $\hat{L}$ AoAs as $\hat{x}_1, \ldots, \hat{x}_{\hat{L}}$. To determine the corresponding coefficients, the technique may include thresholding coefficients corresponding to $\hat{x}_l$, $l > \hat{L}$, to be zero, i.e., $$\hat{H} = \hat{A} \begin{bmatrix} \hat{s}_1 \\ \vdots \\ \hat{s}_{\hat{L}} \\ 0 \\ \vdots \end{bmatrix}$$

The above performs channel recovery if $\alpha$ is known. In one embodiment, the technique or system may estimate $\alpha$ given measurements $y_t, \ldots, y_0$. To simplify analysis, a single subcarrier is considered and the subscript k is dropped for convenience. It is understood that the below is merely one illustrative example to which the disclosed subject matter is not limited.

To estimate $\alpha$, the technique may repeat the same beamforming vector in two consecutive beam sweeping intervals. When the beamforming vector is repeated, a buffer may be updated to save history measurements accordingly such that M−1 history measurements plus one current measurement corresponding to M different beamforming vectors. In such an embodiment, the equivalent measurement matrix may have a full rank.

To estimate time correlation, the technique may repeat the vector every R beam sweeping intervals. For example, if M=R=4, the beamforming vector for different beam sweeping intervals may be assigned as:

$w_1, w_1, w_2, w_3, w_4, w_4, w_1, w_2, w_3, w_3, w_4, w_1, w_2, w_2, w_3, w_4, \ldots$ In various embodiments, the buffer may be updated accordingly. For example, at t=5, (t starts from 0), the technique may employ measurements in periods 1, 2, 3 and 5 to recover the channel. By repeating the vector every R periods, the technique may estimate time correlation as follows:

$$\alpha = \min_\alpha \sum_k |y_{kR+1} - \alpha y_{kR}|^2$$

In various embodiments, only considering the phase information of estimated channel time correlation may be better than the case where both amplitude and phase are considered. Therefore, the technique may estimate channel time correlation $\hat{\alpha}$ according to the equation below, where $\alpha$ is estimated of the above equation.

$$\hat{\alpha} = e^{j\angle\alpha}$$

Figure 3:
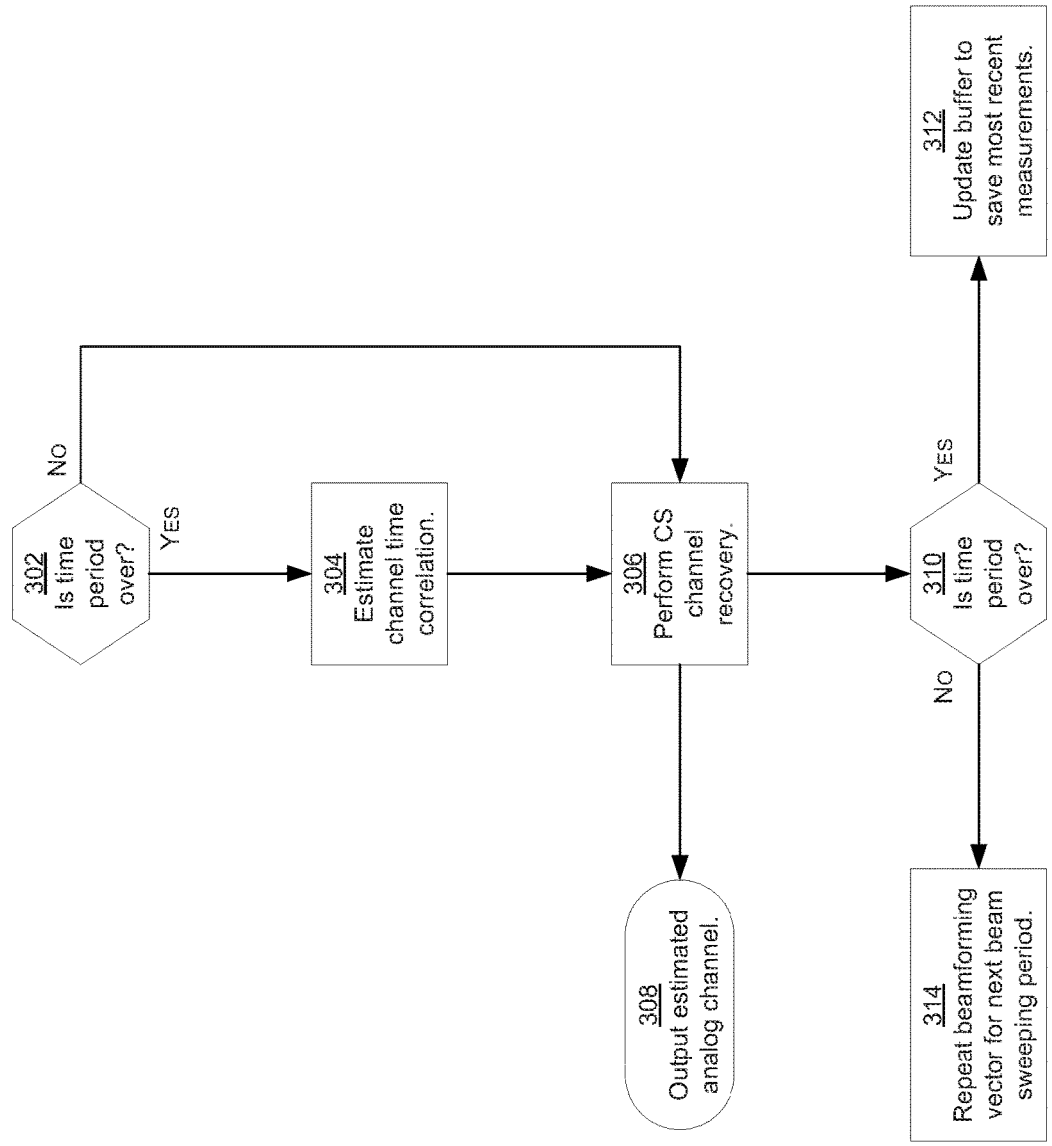
FIG. 3 is a flowchart of an example embodiment of a technique in accordance with the disclosed subject matter.

Turning to FIG. 3, FIG. 3 illustrates a block diagram 300 of a process or technique in which compressive sensing based channel recovery considering time variation of the channel is performed according to one embodiment. In one embodiment, the technique 300 may employ a time period (T) of a window over which the estimation of the channel correlation occurs. In various embodiments, this may be multiple of the beam sweeping period (t).

Block 302 illustrates that, in one embodiment, a check may be made as to whether the estimation frequency (T) has been reached (e.g., by taking a modulus of the period length). If so, Block 304 illustrates that, in one embodiment, that an estimation of the channel time correlation may be performed.

As described above, this estimation may be performed as $\hat{\alpha} = e^{j\angle\hat{\alpha}}$, where $$\hat{\phi}_t = \angle\alpha = \begin{cases} \sigma\hat{\phi}_{t-1} + (1-\sigma)\angle(y^H_{k,t-1}y_{k,t}) & \text{, if } t = cR \text{ for some integers } c \\ \hat{\phi}_{t-1} \end{cases}$$

where $\sigma$ is a constant to average the estimated correlation over different values of t., and $y_{k,t}$ is the estimated combined channel at subcarrier k and time t.

Block 306 illustrates that, in one embodiment, that if the estimation frequency is not reached, or after the estimation of the channel time correlation (Block 304), the compressive sensing based channel recovery may be performed. In one embodiment, the channel recovery may be performed based upon the model given by:

$Y = \text{diag}(\alpha^{M-1}, \alpha^{M-2}, \ldots, 1)WH_{t-M+1} + E$ or more precisely, wherein j=0, ..., T−1

$Y_{t-j} = \alpha^{T-1-j}w_{t-j}H_{t-M+1} + N_{t-j}$

In such an embodiment, a closed form SOMP may be employed to estimate $H_{t-M+1}$, as described above.

Block 308 illustrates that, in one embodiment, that the estimated analog channel ($H_{t-M+1}$) may be output.

Block 310 illustrates that, in one embodiment, that again the tolling of the time period may be determined. If not, then Block 314 illustrates that, in one embodiment, the beamforming vector may be repeated for the next beam sweeping period. If so, Block 312 illustrates that, in one embodiment, a buffer or other memory may be updated to save the most recent measurements. In such an embodiment, a window may effectively be slide across the communication (e.g., communication 100 of FIG. 1) to use as the beam forming vector.

In the above, it was assumed that there was a single measurement per beam sweeping period. In an alternate embodiment, the technique may be extended to include other embodiments. In one such embodiment, the UE may have more than one measurement per beam sweeping interval.

In such an embodiment, $M_O$ may be denoted as the number of measurements per beam sweeping period. In the t-th beam sweeping period, the combined channel may be defined as:

$$Y_t = W_t H_t + N_t$$

Where $Y_t \in \mathcal{C}^{M_0 \times K}$, $W_t \in \mathcal{C}^{M_0 \times N_R}$, and $N_t \in \mathcal{C}^{M \times K}$. $W_t$ is the beam sweeping codebook, where each row represents a beamforming vector used for beam sweeping. In such an embodiment, the UE may consider (M−1) history measurements, i.e., $Y_{t-1}, \ldots, Y_{t-M+1}$, plus one current measurements, i.e., $Y_t$, for channel recovery. As before, denoting $\alpha$ as estimated channel time correlation, the equation may be:

$$Y_{t-m} = \alpha^{M-1-m} W_{t-m} H_{t-M+1} + E_{t-m}, \quad m=0, \ldots, M-1$$

such that $$Y = \tilde{W}(\alpha) H_{t-M+1} + E$$

In such an embodiment, the dominate AoA may be estimated as, where the amplitude is considered:

$$\hat{x}_1 = \operatorname*{argmax}_{x} \frac{\tilde{\varphi}(x)^H YY^H \tilde{\varphi}(x)}{\|\tilde{\varphi}(x)\|^2}, \quad \tilde{\varphi}(x) = \tilde{W}(\hat{\alpha}) a(x)$$

The remaining AoAs may be estimated using a closed form SOMP technique if $\tilde{W}$ satisfies certain conditions, or a classical SOMP technique otherwise. In the illustrated embodiment, the closed form SOMP is applied and the remaining AoAs may be given as $$\hat{x}_m = \hat{x}_1 + \frac{2\pi}{\min(M_0 M, N_R)}(l-1),$$

where $m = 2, \ldots, \min(M_0 M, N_R)$

The corresponding coefficients may be estimated as described above and the channel may recovered as described above. Similarly, one can also consider recovering the channel with different number of AoAs by thresholding.

Alternatively, in another embodiment, in the case where $M_O > 1$, the technique may estimate AoAs using both current and history measurements, while estimating coefficients only using current measurements. In this case, $M_O$ AoAs may be estimated from all or many available measurements. The AoAs may be estimated using either closed form SOMP or SOMP techniques, denoted by $\hat{x}_m$, m=1, ..., $M_O$. In such an embodiment, the AoAs may be $$\tilde{A}_t = [a(\hat{x}_1), \ldots, a(\hat{x}_{M_0})]$$

When only current measurements are used to estimate coefficients, the technique may employ:

$$\hat{S} = (W_t \tilde{A}_t)^{-1} Y_t \in \mathcal{C}^{M_0 \times K}$$

In such an embodiment, the channel may be estimated as:

$$\tilde{H} = \hat{A}_t \tilde{S}$$

In another embodiment, joint frequency offset (FO) and AoA estimation may be employed. In such an alternative embodiment, the analog channel may be recovered by applying joint FO and AoA estimation. In each iteration, one AoA and its corresponding FO are estimated as follows.

In the first iteration, $\hat{x}_{1,t}$, $\varnothing_1$ estimated from $$(\hat{x}_{1,t}, \hat{\varnothing}_1) = \operatorname*{argmin}_{x,\varnothing} \|Y_c - \tilde{W}_c(\phi) a(x) s\|_F = \operatorname*{argmin}_{x,\varnothing} \frac{\tilde{\varphi}_{c(x,\varnothing)}^H Y_c Y_c^H \tilde{\varphi}_c(x,\varnothing)}{\|\tilde{\varphi}_c(x,\varnothing)\|^2}$$

where $\tilde{\varphi}_c(x, \varnothing) = \tilde{W}_c(\phi) a(x) \in \mathcal{C}^{MT}$ In various embodiments, this equation may be solved by exhaustive search over a set of quantized values. Denote $\hat{x}_{l,t}$, $\hat{\varnothing}_l$. Denote estimated AoA and FO in the l-th iteration. Define $\hat{\Phi}_{l,t} = [\tilde{\varphi}_c(\hat{x}_{1,t}, \hat{\varnothing}_1) \cdots \tilde{\varphi}_c(\hat{x}_{l,t}, \hat{\varnothing}_l)] \in \mathcal{C}^{MM_0 \times l}$ In such an embodiment, coefficients corresponding to, may be estimated according to $$\hat{S}_{l,t} = \hat{\Phi}_{l,t}^{-1} Y_c$$

Note that, columns in $\hat{\Phi}_{l,t}$ may not necessarily be orthogonal and therefore the matrix inverse is used. The residual is updated as $$R_{l+1,t} = Y_c - \hat{\Phi}_{l,t} \hat{S}_{l,t}$$

Given $R_{l+1,t}$, in the (l+1)-th iteration, the new AoA and FO may be estimated from:

$$(\hat{x}_{1,l+1}, \hat{\varnothing}_{l+1}) = \operatorname*{argmin}_{x,\varnothing} \frac{\tilde{\varphi}_c(x,\varnothing)^H R_{l+1,t} R_{l+1,t}^H \tilde{\varphi}_c(x,\varnothing)}{\|\tilde{\varphi}_c(x,\varnothing)\|^2}$$

In various embodiments, the iteration may terminate after L iterations. The channel may be recovered as $$\hat{H}_t = [a(\hat{x}_{1,t}) \ldots a(\hat{x}_{L,t})] \begin{bmatrix} e^{j(T-1)\hat{\varnothing}_1} \hat{\underline{s}}_{1,t} \\ \vdots \\ e^{j(T-1)\hat{\varnothing}_L} \hat{\underline{s}}_{L,t} \end{bmatrix}$$

where $\hat{\underline{s}}_{l,t}$ denotes the l-th row of $\hat{S}_{L,t}$.

In yet another embodiment, when channel correlation is unknown, the technique may recover the channel only using magnitude information and estimating one AoA $$\hat{x}_{1,t} = \operatorname*{argmin}_{x} \frac{|\varphi_c(x)|^H |Y_c| |\gamma_c|^H |\varphi_c(x)|}{\|\varphi_c(x)\|^2}, \quad \varphi_c(x) = W_c a(x)$$

The channel may be recovered as:

$$\hat{H}_t = a(\hat{x}_{1,t}) 1^T$$

Figure 4:
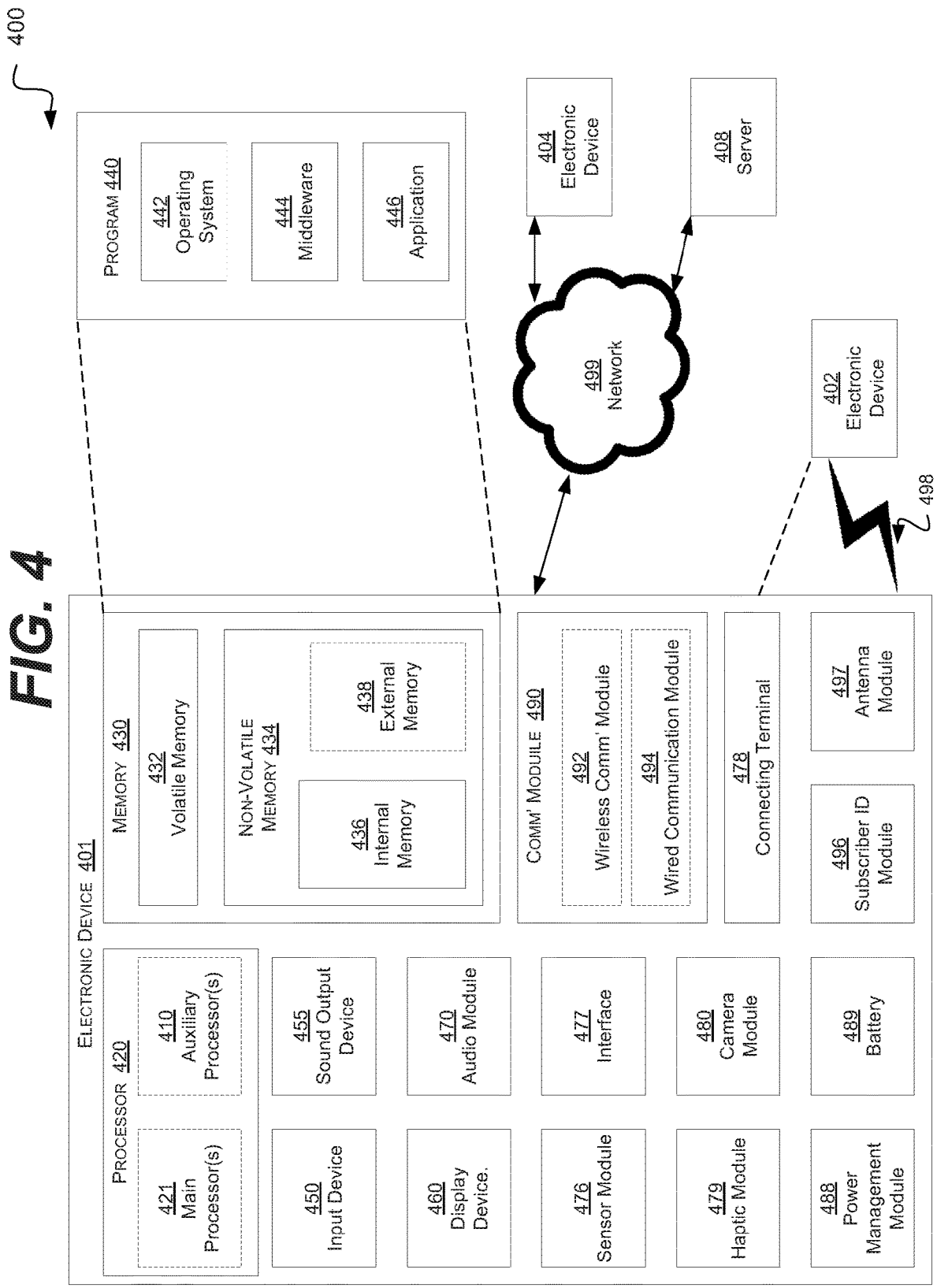
FIG. 4 is a schematic block diagram of an information processing system that may include devices formed according to principles of the disclosed subject matter.

FIG. 4 illustrates a block diagram of an electronic device 401 in a network environment 400, according to one embodiment. Referring to FIG. 4, the electronic device 401 in the network environment 400 may communicate with another electronic device 402 via a first network 498 (e.g., a short-range wireless communication network), or another electronic device 404 or a server 408 via a second network 499 (e.g., a long-range wireless communication network). The electronic device 401 may also communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 410 (e.g., a graphics processing unit (GPU), an image signal processor (ISP), a sensor hub processor, or a communication processor (CP)) that may be operable independently from, or in conjunction with, the main processor 421. Additionally or alternatively, the auxiliary processor 410 may be adapted to consume less power than the main processor 421, or execute a particular function. The auxiliary processor 410 may be implemented as being separate from, or a part of, the main processor 421.

The auxiliary processor 410 may control at least some of the functions or states related to at least one component (e.g., the display device 460, the sensor module 476, or the communication module 490) among the components of the electronic device 401, instead of the main processor 421 while the main processor 421 may be in an inactive (e.g., sleep) state, or together with the main processor 421 while the main processor 421 may be in an active state (e.g., executing an application). According to one embodiment, the auxiliary processor 410 (e.g., an image signal processor or a communication processor) may be implemented as part of another component (e.g., the camera module 480 or the communication module 490) functionally related to the auxiliary processor 410.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which may be not rechargeable, a secondary cell which may be rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or server 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that may be readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method, comprising:
   estimating a combined channel by performing processes that include applying a beamforming codebook to a channel measurement;
   estimating a channel time correlation of the combined channel based at least in part upon a measurement of the combined channel corresponding to a current beam sweeping interval and a measurement of the combined channel corresponding to a previous beam sweeping interval; and
   recovering a current channel by implementing a compressive sensing-based channel recovery based on the estimated channel time correlation, the measurement of the combined channel corresponding to the previous beam sweeping interval, and the measurement of the combined channel corresponding to the current beam sweeping interval.

2. The method of claim 1, wherein recovering is based upon a time variation of the combined channel.

3. The method of claim 1, wherein estimating the combined channel includes a multiple number of beam sweeping intervals within a predefined time window.

4. The method of claim 1, wherein recovering includes:
   inputting an estimate of the combined channel for current and multiple previous beam sweeping intervals;
   inputting beam sweeping codebooks for current and previous beam sweeping intervals; and
   estimating the channel time correlation.

5. The method of claim 4, wherein recovering includes employing a simultaneous orthogonal matching pursuit (SOMP) or a closed-form SOMP technique.

6. The method of claim 1, wherein recovering includes:
   inputting an estimate of the combined channel for current and multiple previous beam sweeping intervals;
   inputting beam sweeping codebooks for current and previous beam sweeping intervals;
   estimating a dominant angle of arrival (AoA); and
   estimating a path gain of the dominant angle of arrival.

7. The method of claim 6, further comprising estimating the dominant angle of arrival based, at least in part upon, an amplitude of the combined channel.

8. The method of claim 1, wherein the current beam sweeping interval and the previous beam sweeping interval are consecutive beam sweeping intervals.

9. The method of claim 1, wherein estimating the channel time correlation repeats based upon a predefined time period that includes at least two beam sweeping intervals.

10. A system, comprising:
    a processor; and
    a memory configured to store non-transitory processor-executable instructions that, when executed by the processor, cause the processor to:
    estimate a combined channel by performing processes that include applying a beamforming codebook to a channel measurement;
    estimate a channel time correlation of the combined channel based at least in part upon a measurement of the combined channel corresponding to a current beam sweeping interval and a measurement of the combined channel corresponding to a previous beam sweeping interval; and
    recover a current channel by implementing a compressive sensing-based channel recovery based on the estimated channel time correlation and measurements of the combined channel for the current and for multiple previous beam sweeping intervals.

11. The system of claim 10, wherein the instructions that cause the processor to recover are based upon a time variation of the combined channel.

12. The system of claim 10, wherein the instructions that cause the processor to estimate the combined channel includes estimating the combined channel over the current beam sweeping interval and multiple previous beam sweeping intervals within a predefined time window.

13. The system of claim 10, wherein the instructions that cause the processor to recover includes recovering by:
    inputting an estimate of the combined channel for current and multiple previous beam sweeping intervals;
    inputting beam sweeping codebooks for current and previous beam sweeping intervals; and
    estimating the channel time correlation and recover the current channel.

14. The system of claim 13, wherein recovering includes employing a simultaneous orthogonal matching pursuit (SOMP) or a closed-form SOMP technique.

15. The system of claim 10, wherein the instructions that cause the processor to recover includes instructions for:
    inputting an estimate of the combined channel for current and multiple previous beam sweeping intervals;
    inputting beam sweeping codebooks for current and previous beam sweeping intervals;
    estimating a dominant angle of arrival (AoA); and
    estimating a path gain of the dominant angle of arrival.

16. The system of claim 15, further comprising instructions for estimating the dominant angle of arrival based, at least in part upon, an amplitude of the combined channel.

17. The system of claim 10, wherein the current beam sweeping interval and the previous beam sweeping interval are consecutive beam sweeping intervals.

18. The system of claim 10, wherein the instructions that cause the processor to estimate the channel time correlation provide for estimating the channel time correlation that repeats based upon a predefined time period that includes at least two beam sweeping intervals.

19. A method, comprising:
- estimating a combined channel by performing processes that include applying a beamforming codebook to a channel measurement;
- estimating a channel time correlation of the combined channel based at least in part upon a measurement of the combined channel corresponding to a current beam sweeping interval and a measurement of the combined channel corresponding to a previous beam sweeping interval; and
- recovering a current channel by implementing either a simultaneous orthogonal matching pursuit (SOMP) or a closed-form SOMP technique based on the estimated channel time correlation.

20. The method of claim 19, wherein estimating the combined channel includes the current beam sweeping interval and multiple previous beam sweeping intervals within a predefined time window.

\* \* \* \* \*